(12) United States Patent
Matoba et al.

(10) Patent No.: US 6,574,839 B2
(45) Date of Patent: Jun. 10, 2003

(54) SWIVEL SNAP HOOK OF SYNTHETIC RESIN

(75) Inventors: Hiroshi Matoba, Toyama-ken (JP); Ryoichiro Uehara, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/839,172

(22) Filed: Apr. 23, 2001

(65) Prior Publication Data
US 2001/0037543 A1 Nov. 8, 2001

(30) Foreign Application Priority Data
Apr. 27, 2000 (JP) .................................. 2000-128091

(51) Int. Cl.[7] ............................................... F16B 45/00
(52) U.S. Cl. ..................................... 24/601.2; 24/600.9
(58) Field of Search ........................ 24/68 CT, 68 TT, 24/165, 265 H, 265 AL, 298–302, 369–376, 378.1, 598.7, 598.4, 905, 599.1–600.2, 600.4, 601.2, 907; 294/82.17, 82.21, 82.23, 82.26, 82.27, 82.31, 82.33, 82.34

(56) References Cited

U.S. PATENT DOCUMENTS

| | | | | |
|---|---|---|---|---|
| 2,787,435 A | * | 4/1957 | Shields ................... 24/601.2 X |
| 3,778,871 A | * | 12/1973 | Ratte, Jr. ................... 24/601.2 |
| 4,464,813 A | * | 8/1984 | Bakker et al. ............. 24/601.1 |
| 4,617,704 A | * | 10/1986 | Kasai ....................... 24/601.2 |
| 4,622,724 A | * | 11/1986 | Dupre ................... 24/601.2 X |
| 4,665,592 A | * | 5/1987 | Kasai ....................... 24/601.2 |
| 4,691,416 A | * | 9/1987 | Nakayama et al. .... 24/601.2 X |
| 5,092,018 A | * | 3/1992 | Seron ................... 24/598.4 X |
| 5,161,287 A | * | 11/1992 | Picollet ................... 24/601.2 |
| 5,475,901 A | * | 12/1995 | Anscher ................... 24/265 H |
| 5,671,514 A | * | 9/1997 | Matoba et al. ............. 24/601.2 |
| 6,000,108 A | * | 12/1999 | Roan ......................... 24/600.9 |
| 6,317,940 B1 | * | 11/2001 | Matoba et al. ............. 24/600.9 |

FOREIGN PATENT DOCUMENTS

| | | |
|---|---|---|
| DE | 1147430 | 4/1963 |
| EP | 1052417 | 11/2000 |
| JP | 5-7567 | 7/1986 |
| JP | 4-35161 | 6/1992 |

OTHER PUBLICATIONS

European Patent Office Search Report dated Jun. 21, 2002.

* cited by examiner

Primary Examiner—James R. Brittain
Assistant Examiner—Ruth C. Rodriguez
(74) Attorney, Agent, or Firm—Finnegan, Henderson, Farabow, Garrett & Dunner, L.L.P.

(57) ABSTRACT

In a swivel snap hook having a hook body and a stopper piece, a protrusion, which is molded integrally with a front-end inside engaging face or a front-end outside engaging face of the hook body or the stopper piece, is provided so as to have a minute protruding height and be protruded toward a mating engaging face. Further, a minute portion at a tip end of the protrusion is molded integrally with the mating engaging face. Consequently, the swivel snap hook can be molded such that the front-end outside engaging face of the stopper piece is closed to the front-end inside engaging face of the hook body. Therefore, in the swivel snap hook, a length and a depth of the hook body thereof can be set as the conventional ones, while it can be molded in a state that the front-end outside engaging face of the stopper piece is kept in contact with the front-end inside engaging face of the hook body.

5 Claims, 6 Drawing Sheets

SWIVEL SNAP HOOK OF SYNTHETIC RESIN

BACKGROUND OF THE INVENTION

1. Field of the Invention

The present invention relates to a swivel snap hook made of synthetic resin to be used for various kinds of bags, knapsacks and the like.

2. Description of the Related Art

A metallic swivel snap hook of this kind, which has been often used, requires a number of components. Therefore, a number of production steps are required, thereby raising its production cost. Further, such a swivel snap hook is difficult to color in a durable fashion. Thus, the swivel snap hook tends to have a poor appearance and is unsuitable for a traveler's bag, a shoulder bag and the like. For the reason, the use of this kind of the swivel snap hook has been restricted to luxury goods. Therefore, instead of this kind of the metallic swivel snap hook, a swivel snap hook made of synthetic resin has been used in an increased number of fields. This swivel snap hook of synthetic resin ensures an excellent productivity, a low cost and a small weight.

An example of such a swivel snap hook of synthetic resin is disclosed in, for example, Japanese Patent Publication No. 5-7567. This swivel snap hook is comprised of a belt-connecting ring, on which an end of a belt is to be attached, a swivel-snap-hook main body extending therefrom via a base portion. The swivel-snap-hook main body has at its upper part an enlarged engaging head portion via a neck portion, and at its lower part a hook body in a shape of a hook and a stopper piece extended along an opening of the hook body. The enlarged portion is engaged with a central engaging hole portion of the belt-connecting ring so as to be rotatable, so that it is integrally joined with the belt-connecting ring.

In the swivel snap hook as disclosed in this publication, a gate-shaped main body of the belt-connecting ring and a connecting bar for connecting both leg portions of the gate-shaped main body and capable of rotating around its center line are molded together in a single process using a pair of molding dies, in such a manner that both axis ends of the connecting bar are fitted in the respective fitting holes of the both leg portions. Because the belt-connecting ring is molded in a single process, the swivel snap hook can be assembled by such a simple operation that the enlarged head portion of the swivel-snap-hook main body is only made to be pressed into the engaging hole portion formed in a center of the connecting bar during the molding. Therefore, the assembly work can be facilitated and the production cost can be reduced.

In the swivel snap hook as disclosed in this publication, however, the stopper piece is molded such that it is slightly apart from an outside face of a front end of the hook body as disclosed in this publication and after being molded, the stopper piece is deformed elastically so that it can be hooked by an inside engaging face at the front end of the hook body. Therefore, troublesomeness for that process still exist, with a result that the production cost is raised to some extent.

On the other hand, according to Japanese Patent Publication No. 4-35161 for example, a swivel-snap-hook main body is molded with a slight gap between a front-end outside engaging face of a stopper piece and a front-end inside engaging face of a hook body, in order to omit a step of deforming the stopper piece to bring it into contact with the inside engaging face at the front end of the hook body. However, if the swivel-snap-hook main body is molded such that the front-end outside engaging face of the stopper piece is closed to the front-end inside engaging face of the hook body, the opposing engaging faces may be fused to each other so as to be integrated with each other. Therefore, it is necessary to make said gap sufficient for avoiding such a fusion. However, this gap allows a mating ring member to be hooked by the hook body to be slipped out therefrom easily. To avoid this, according to the above-described publication, a rib-like protrusion is provided on the inside engaging face of the hook body opposing the front end of the stopper piece.

The hook body is preferably so designed that its depth is as small as possible within a size allowable for the ring member to be hooked by the hook body. However, even if it is intended to form the gap between the front-end outside engaging face of the stopper piece and the front-end inside engaging face of the hook body to its minimum size, the gap has such a size that does not generate a fusion of the engaging faces at the time of molding, so the depth of the hook body is required to be large to that extent, which is not desirable in terms of appearance.

SUMMARY OF THE INVENTION

The present invention has been achieved to solve the above-described problems. Therefore, an object of the invention is to provide a swivel snap hook of synthetic resin in which the length and the depth of a hook body can be set to the same extent as the conventional ones and which can be molded such that a front-end outside engaging face of a stopper piece is in contact with a front-end inside engaging face of the hook body.

The above-described object can be achieved effectively by the following aspects of the present invention.

Specifically, according to a first aspect of the present invention, there is provided a swivel snap hook of synthetic resin including: a hook body having a hook extended from a base portion of the hook body; and a stopper piece having a front-end outside engaging face to be engaged with a front-end inside engaging face of a curved portion of the hook body, the front-end outside engaging face being extended up to the front-end inside engaging face, the stopper piece being elastically deformable with respect to a base end thereof as a fulcrum, wherein the front-end inside engaging face of the curved portion has a protrusion having a minute protruding height and protruded toward the front-end inside engaging face of the stopper piece.

The base end of the stopper piece is preferred not to be elastically deformed directly, and has such a structure that the base end is not broken even if a strong external force is applied to some extent. On the other hand, although the hook body and a belt-connecting ring are different in design from the conventional ones, the structure, operation, and effect thereof are not different.

Although according to the prior art, the swivel snap hook is molded in such a state that the front end of the stopper piece is located outside the front end of the hook body and after the molding, the stopper piece is elastically deformed to make its front end elastically engage with the front-end inside engaging face of the hook body, as described above. According to the present invention, such an operation is not required, so that the productivity is enhanced and production cost can be reduced.

The feature of the present invention is to provide the front-end inside engaging face of the hook body with a protrusion having a minute protruding height so as to face the front-end outside engaging face of the stopper piece. Therefore, when the swivel-snap-hook main body is molded, the minute protrusion is integrally molded on the front-end inside engaging face of the hook body. Thus, even if the swivel snap hook is molded with the front-end outside engaging face of the mating stopper piece being close to the front-end inside engaging face of the hook body, both the engaging faces are not fused to each other. Consequently, it can be molded with the front-end outside engaging face of the stopper piece being close to the front-end inside engaging face of the hook body, while the depth of the hook body can be set to be substantially as small as the conventional ones.

If it is intended to form a molding cavity for the protrusion such that it communicates with a molding cavity for the front-end inside engaging face of the hook body and is slightly apart from the molding cavity for the front end of the stopper piece, high precision processing of the molding dies and the material of high toughness are required, with which the production cost may be affected to a large extent. Then, according to a second aspect of the present invention, a minute portion of a tip end of the protrusion is molded integrally with an opposing surface of the stopper piece.

That is, the molding die is constructed such that the molding cavity for the inside engaging face of the hook body communicates with the molding cavity for the front end of the stopper piece via the molding cavity for the protrusion. At this time, a communicating aisle between the molding cavity for the protrusion and the molding cavity for the front end of the stopper piece end is made to be as minute as a pin hole. Consequently, after the molding, the tip end of the protrusion communicates with the front end of the stopper piece in a minute connection. Then, because the connection is minute, it is broken easily at the time of a first use of a finished product after being molded. As a result, the front end of the stopper piece comes into a firm contact with the tip end of the protrusion, or there is only a minute gap therebetween, which never damages a function of the swivel snap hook.

According to the first aspect of the present invention, the protrusion having a minute protruding height is provided on the front-end inside engaging face of the hook body. According to the second aspect of the present invention, the protrusion is molded such that the tip end thereof is integrated with the front-end outside engaging face of the stopper piece at a minute portion like a pin hole. According to a third aspect of the present invention, there is provided a swivel snap hook of synthetic resin comprising: a hook body having a hook extended from a base portion of the hook body; and a stopper piece having a front-end outside engaging face to be engaged with a front-end inside engaging face of a curved portion of the hook body, the front-end outside engaging face being extended up to the front-end inside engaging face, the stopper piece being elastically deformable with respect to a base end thereof as a fulcrum, wherein the front-end outside engaging face of the stopper piece has a protrusion having a minute protruding height and protruded toward the front-end inside engaging face of the curved portion. Further, according to a fourth aspect of the present invention, a minute portion of a tip end of the protrusion on the front-end outside engaging face of the stopper piece is integrally molded with the front-end inside engaging face of the curved portion. The operations and effects of the third and fourth aspects of the present invention are substantially the same as the first and second aspects thereof.

According to a fifth aspect of the present invention, a rib-like protrusion is provided below the front-end inside engaging face of the curved portion of the hook body, the rib-like protrusion having an inside end face on an extension of a front-end inside face of the stopper piece.

If such a protrusion, which is minute, is provided on the front-end inside engaging face of the hook body, when an annular member hooked by the hook body is tried to be removed from the hook body, it is caught by the protrusion so that a user may feel uncomfortable. Further, if the inside end face of the rib-like protrusion is extended inward of the extension of the front end inside face of the stopper piece, the annular member is made to be floated off a bottom face of the hook body. As a result, even if the stopper piece is pushed inward to remove the annular member from the hook body, the annular member interferes with the stopper piece, so that it cannot be removed easily.

According to a sixth aspect of the present invention, a height of the rib-like protrusion is slightly shorter than a gap between the front end of the stopper piece and the bottom face of the hook body.

A section of the annular member to be hooked by the hook body may be various in shape, such as a circular section, a square section and a narrow rectangular section. In case where the section is a narrow rectangular one or a plate-shape, if the rib-like protrusion is low, the annular member invades in between the rib-like protrusion and the front end of the stopper piece, so that the stopper piece is difficult to elastically deform by pressing or the annular member may be caught by the front end of the stopper piece.

According to a seventh aspect of the present invention, the rib-like protrusion is connected to the protrusion having a minute protruding height and protruded from the inside engaging face of the curved portion. If the rib-like protrusion and the protrusion having the minute protruding height are connected together, when the annular member is hooked by the hook body or removed therefrom, the annular member can be moved smoothly into and out of the inside of the hook body.

DESCRIPTION OF THE EMBODIMENTS

Figure 1:
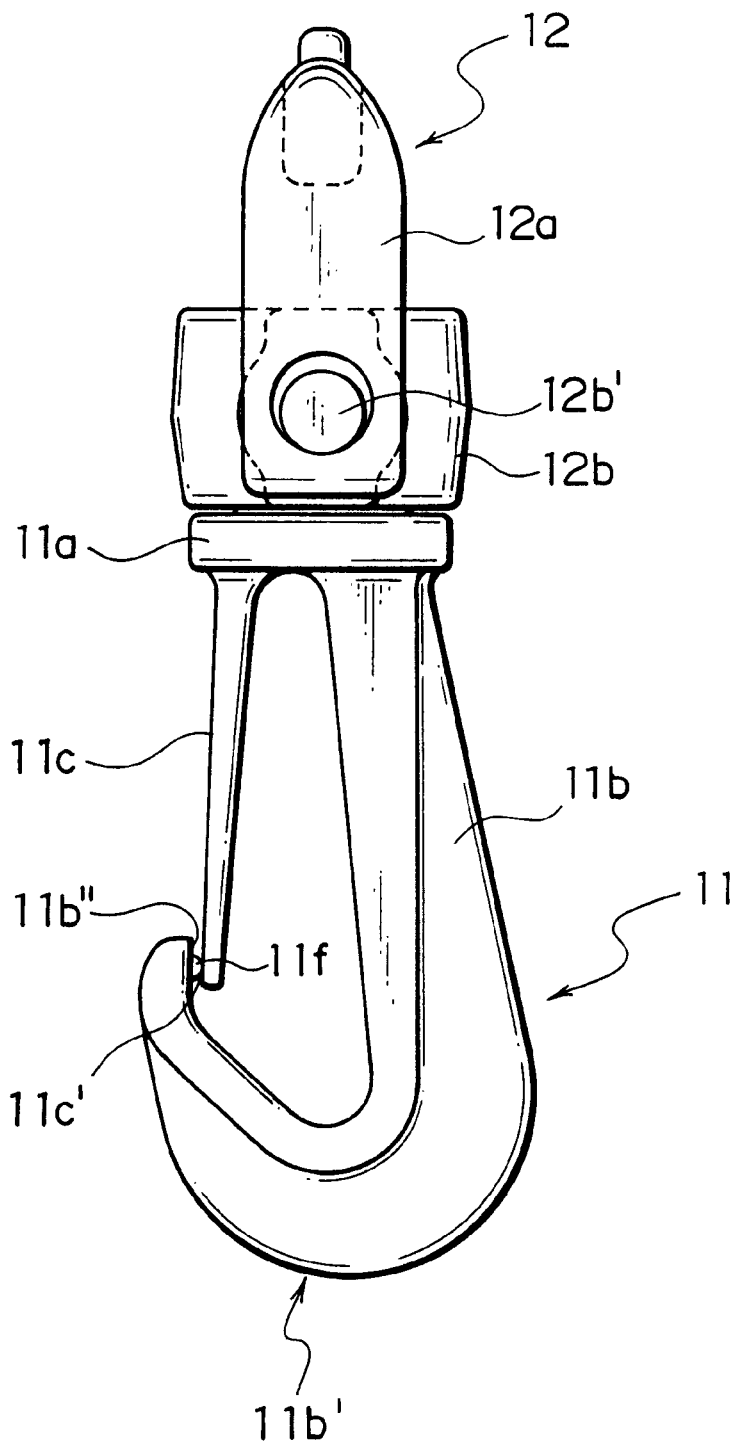
FIG. 1 is a front view of a swivel snap hook according to a first embodiment of the present invention.

Hereinafter, embodiments of the present invention will be described in detail with reference to the accompanying drawings. According to the aforementioned Japanese Patent Application Laid-Open No. 5-215117 or EP No. 0099577, a swivel snap hook 1 shown in FIG. 1 is molded by integrally assembling a belt-connecting ring and a swivel-snap-hook main body after they are molded independently. Besides this, as described in the aforementioned Japanese Patent Publication No. 4-35161 or U.S. Pat. No. 5,566,428, the belt-connecting ring, which connects a belt or the like with the swivel snap hook, and the swivel-snap-hook main body are molded in a state that they are connected with each other so as to be rotatable around a center line in a longitudinal direction thereof.

Figure 2:
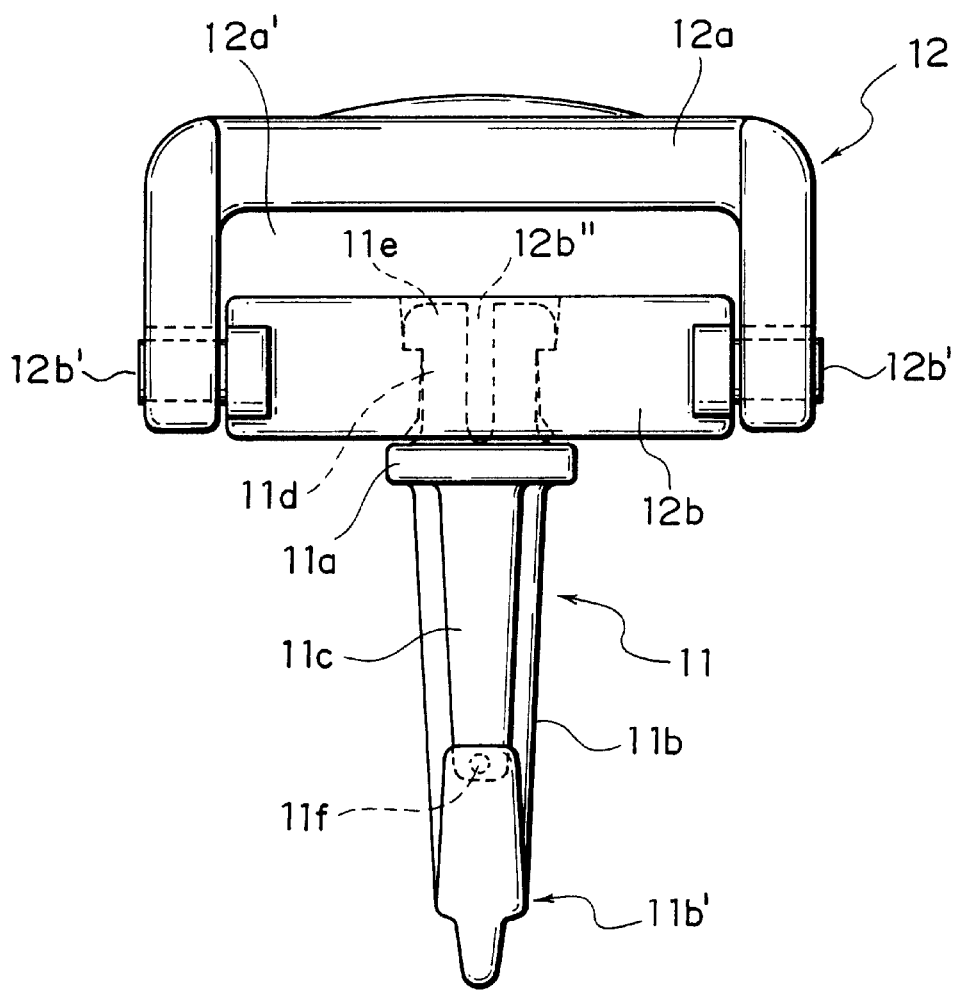
FIG. 2 is a side view of the swivel snap hook as viewed from a stopper piece thereof.
Figure 3:
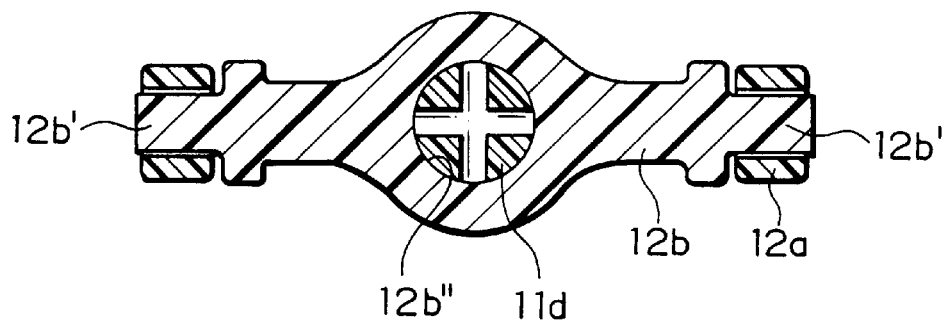
FIG. 3 is a top view of the swivel snap hook.
Figure 4:
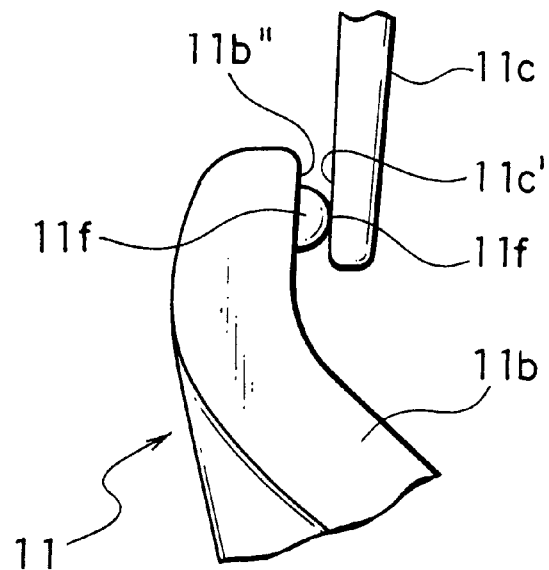
FIG. 4 is an enlarged front view of a front-end engaging portion of the swivel snap hook.

FIGS. 1 to 4 show a first embodiment of the present invention. FIG. 1 is a front view of a swivel snap hook, FIG. 2 is a side view thereof, FIG. 3 is a top view thereof, and FIG. 4 is an enlarged front view thereof. Referring to these Figures, a swivel-snap-hook main body 11 is comprised of a disc-shaped base portion 11a, a hook body 11b protruded from a surface of the base portion 11a having a substantially T-shaped section, and a stopper piece 11c extended from the surface of the base portion 11a so as to oppose an inner face of a base of the hook body 11b, up to a front-end inside engaging face 11b' of a curved portion 11b' of the hook body 11b. Further, on the other surface of the base portion 11a, the swivel-snap-hook main body 11 has a enlarged small-disc shaped engaging head portion 11e, via a small-diameter neck portion 11d. The neck portion 11d and the engaging head portion 11e are divided to four sections in a plan view as shown in FIG. 3 so that they can elastically deform in a diameter expanding direction and in a diameter reducing direction thereof.

On the other hand, a belt-connecting ring 12, with which the aforementioned engaging head portion 11e engages, is comprised of an entirely gate-shaped belt-connecting portion 12a having a belt insertion hole 12a' and a support member 12b supported by right and left leg potions of the belt-connecting portion 12a so as to be rotatable and having both end shaft portions 12b' and an engaged portion 12b" formed in a center thereof so as to have a large diameter hole and a small diameter hole via a step, with which the engaging head portion 11e of the swivel-snap-hook main body 11 engages. According to this embodiment, the hook main body 11 and the belt-connecting ring 12 are molded separately. Because this molding method is substantially not different from the molding method disclosed in the aforementioned Japanese Patent Publication No. 5-7567, a description thereof is omitted.

Though the belt-connecting ring 12 is different from the conventional ones in terms of design, the structure, operation and effect thereof are not different in any particular points. On other hand, the hook body 11b partly has a structure that is a characteristic structure of the present invention. Therefore, in a description below, explanation about the belt-connecting ring 12 is omitted and the structure, operation and effect that are related to the swivel-snap-hook main body 11 will be described in detail.

As can be understood easily from FIGS. 1 and 2, the characteristic structure of the hook body 11b according to this embodiment is in that the front-end inside engaging face 11b", which is to be engaged with a front-end outside engaging face 11c' of the stopper piece 11c, is formed on an opening end of the curved portion 11b' of the hook body 11b and has a minute-height protrusion 11f, which is integrally molded therewith at the time of molding. The protrusion 11f of this embodiment is substantially semi-spherical, part which opposes the front-end outside engaging face 11c' of the stopper piece 11c, which is a flat face, as shown in FIG. 4.

If it is intended to form a cavity for each of the front-end outside engaging face 11c' of the stopper piece 11c and the front-end inside engaging face 11b" of the hook body 11b such that those cavities is as close to each other as possible as in the conventional ones, the cavities need to be partitioned by a very thin partition wall in an entire region of the engaging faces 11b" and 11c'. Therefore, a molding die to be used for this purpose needs to be formed of a metal having a high stiffness and an excellent toughness, which could raise the cost for the material and increase the production cost. Thus, such a molding die is impossible to be reduced to practice.

Further, even if the aforementioned molding die are obtained, when the die is opened after the molding is completed, the respective engaging faces 11b" and 11c', which have not yet been cooled and hardened completely, are likely to be fused to each other, so that the function of the swivel-snap-hook main body 11 may be lost. On the other hand, if the engaging faces 11b" and 11c' are molded with a sufficient gap therebetween as in the conventional ones, in order to avoid this fusion, a depth of the hook body 11b needs to be increased by the amount of that gap. Consequently, the size of such a swivel snap hook is increased, thereby decreasing a trade value of the product in terms of fashionability and the like.

If the protrusion 11f having a minute height is provided on the front-end inside engaging face 11b" as described in this embodiment, a gap between the front end of the stopper piece 11c and the protrusion 11f having such a minute height can be minimized, so that the gap between the respective engaging faces 11b" and 11c' can be of such a size that does not cause fusion therebetween. Thus, they both can be close to each other more than in the conventional ones and sufficient elastic deformation of the stopper piece 11c can be ensured. Further, because both the engaging faces 11b" and 11c' are molded separately from each other via the protrusion 11f when the molding is completed, the aforementioned fusion can be avoided. Therefore, not only processing of the molding die is facilitated, but also it becomes no longer necessary to use any special material for the molding die.

Even if the protrusion 11f having a minute height is provided so as to protrude on the front-end inside engaging face 11b", such that the front end of the mating stopper piece 11c is located inside the front end of the hook body 11b as in this embodiment, a sufficient elastic deformation amount of the stopper piece 11c can be secured while the depth of the hook body 11b is kept to be the same as the conventional ones.

Figure 5:
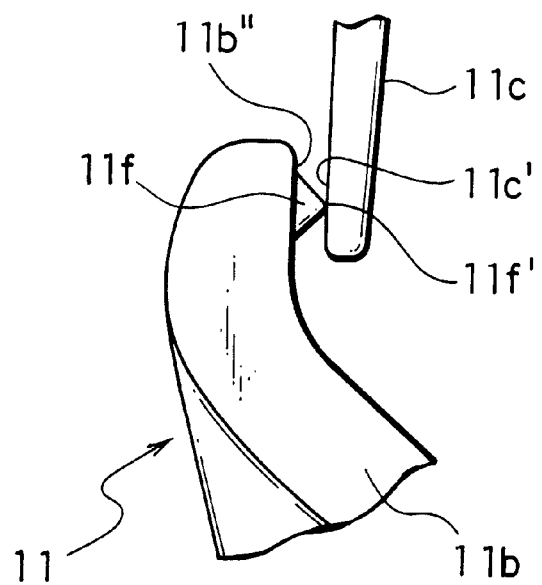
FIG. 5 is an enlarged front view of a front-end engaging portion of the swivel snap hook according to a second embodiment of the present invention.
Figure 6:
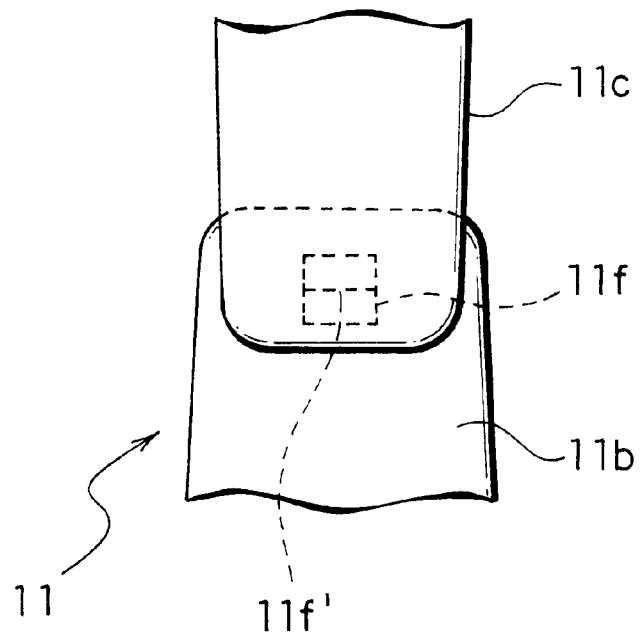
FIG. 6 is an enlarged side view of the engaging portion of the second embodiment.

FIGS. 5 and 6 show a second embodiment of the present invention. According to the aforementioned first embodiment, the protrusion 11f is molded in a form of a semi-sphere and the protrusion 11f is separated from the front-end outside engaging face 11c' of the stopper piece 11c. According to this second embodiment, on the other hand, a protrusion 11f is molded in a form of a triangle. Further, an edge line at a vertex of the triangle, that is a minute portion 11f', is integrally connected to the front-end outside engaging face 11c of the stopper piece 11c when the molding is carried out.

As a result, it never happens that the protrusion 11f and the stopper piece 11c are separated from each other due to a contraction at the time of molding so that the distance therebetween is increased. Further, the shape of a product after the molding and hardening, particularly the hook body 11b and the stopper piece 11c, is prevented from being displaced with respect to each other, so that a swivel-snap-hook main body 11 at a stabilized configuration can be obtained. Furthermore, because the protrusion 11f and the front-end outside engaging face 11c' of the stopper piece 11c are only connected to each other via a very minute portion, the connecting portion can be broken easily only if the stopper piece 11c is pressed from its front side when an annular member (not shown) is to be hooked with the hook body 11b at the first time. Consequently, the annular member can be hooked by the hook body 11b through an ordinary hooking action and further, a burr, which is formed by the breaking action, is so small that does not affect any function of the product.

Meanwhile, this molding for such a connection can be applied to the protrusion 11f and the stopper piece 11c of the first embodiment. The configuration of the protrusion is not restricted to a semi-sphere and a triangle. It is permissible to apply such a configuration as a cone or a quadrangular pyramid, as far as its section decreases gradually from its proximal end toward its tip.

Figure 7:
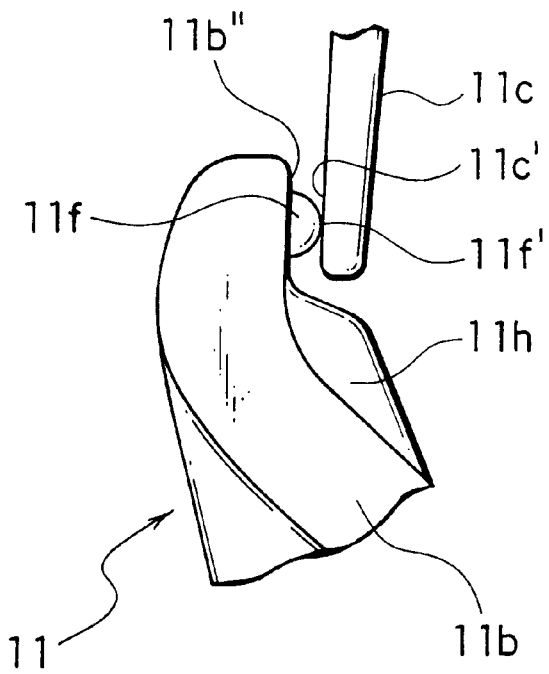
FIG. 7 is an enlarged front view of a front-end engaging portion of a swivel snap hook according to a third embodiment of the present invention.

FIG. 7 shows a third embodiment of the present invention. This third embodiment is different from the first and second embodiments in that a rib-like protrusion 11h is provided below a protrusion 11f as mentioned above on an inner face of a curved portion 11b' of a hook body 11b. According to this third embodiment, the configuration of the aforementioned rib-like protrusion 11h is fin-shaped and its inside end face is located on an extension of an inside face of the front end of the stopper piece 11c. Further, the height of the rib-like protrusion 11h is set to be substantially equal to a gap between the stopper piece 11c and a bottom of the hook body 11b. Meanwhile, the configuration of the rib-like protrusion 11h is not restricted to the example shown here.

When the protrusion 11f is protruded from the front-end inside engaging face 11b" of the hook body 11b even though it is minute, an annular member (not shown) hooked by the hook body 11b is somewhat difficult to be removed off from the hook body 11b, which gives a feeling of discomfort. According to this embodiment, such a feeling of discomfort can be eliminated because the aforementioned rib-like protrusion 11h is provided, so that the annular member can be inserted or removed smoothly.

That is, if the aforementioned rib-like protrusion 11h having the above-described configuration is provided on an inside face of the curved portion 11b' of the hook body 11b at a portion adjacent to the protrusion 11f, when the annular member (not shown) as a mating member is tried to be removed from the swivel snap hook of this embodiment, the annular member is guided up to the height of the protrusion 11f by the rib-like protrusion 11h, so that the annular member can be removed easily from the swivel-snap-hook main body 11. This effect can also be achieved when the annular member is inserted into the inside of the hook body 11b.

If an inside end face of the rib-like protrusion 11h, that is an end face thereof on a bottom side of the curved portion 11b', was extended further inward of the extension of the front-end inside face of the stopper piece 11c, the annular member could be likely to be floated off the bottom of the hook body 11b, so that the annular member could interfere with the stopper piece 11c and could not be removed if the stopper piece 11c is tried to be pushed into for removing the annular member from the hook body 11b. According to this embodiment, the inside end face of the rib-like protrusion 11h is located on the extension of the front-end inside face of the stopper piece 11c, the above described defect can be avoided.

The section of the annular member to be hooked by the hook body 11b is various in shape, such as a circular section, square section and a narrow rectangular section. Assuming that the section of the annular member is a narrow rectangular one, that is the annular member has a frame body composed of a narrow sheet material, if the aforementioned rib-like protrusion 11h is too low, the annular member invades in between the rib-like protrusion 11h and the stopper piece 11c to interfere with the stopper piece 11c. As a result, even if the stopper piece 11c is tried to be deformed inward of the hook body 11b, the stopper piece 11c is difficult to elastically deform, so that the annular member is difficult to remove from the hook body 11b. Or it may happen that part of the annular member go beyond the front end of the stopper piece 11c and is caught thereby so that the annular member can be not settled at the bottom of the curved portion 11b' of the hook body 11b. According to this embodiment, the height of the rib-like protrusion 11h is set to be slightly longer than the gap between the stopper piece 11c and the bottom of the hook body 11b. Therefore, the aforementioned problem never occurs with any shape of the section of the annular member.

Figure 8:
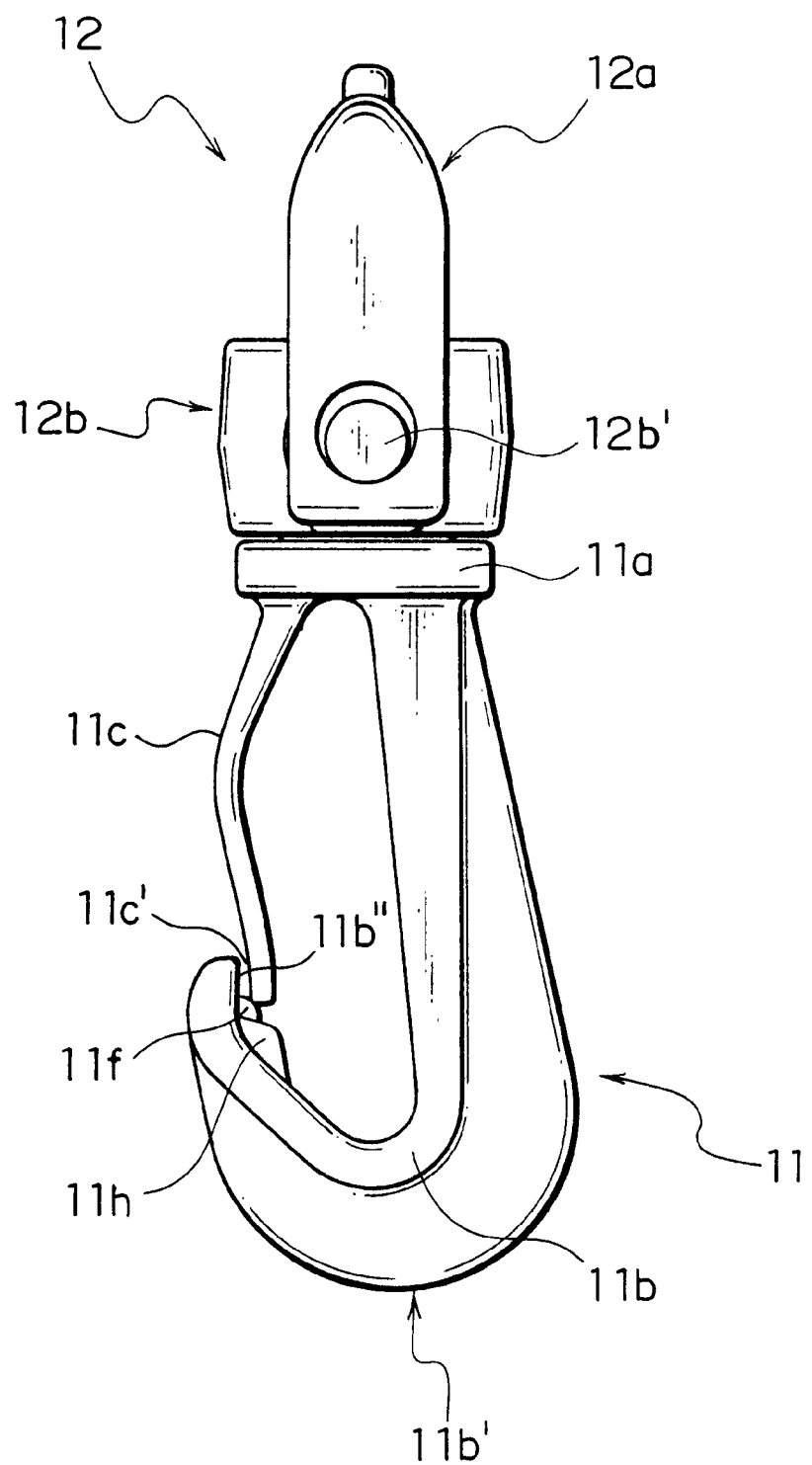
FIG. 8 is a front view of a swivel snap hook according to a fourth embodiment of the present invention.

FIG. 8 shows a fourth embodiment of the present invention, in which the aforementioned rib-like protrusion 11h and the protrusion 11f are connected with each other. In the fourth embodiment, as well as the above described embodiments, a load is applied to the rib-like protrusion 11h by a mating annular member (not shown). Therefore, this rib-like protrusion 11h needs to have enough stiffness to bear this load. Therefore, the width of the rib-like protrusion 11h (in a width direction of the hook body 11b) is made to be much larger than a width of the protrusion 11f.

According to this fourth embodiment, the rib-like protrusion 11h is integrated with the protrusion 11f, so that the protrusion 11f, which is likely to be deformed because it is so minute a body that have a low stiffness, can be reinforced by the rib-like protrusion 11h. Therefore, the durability of the protrusion 11f is improved.

Further, according to this fourth embodiment, the stopper piece 11c outward at a center portion thereof. Such a configuration of the stopper piece 11c makes it easy to push the stopper piece 11c into the inside of the hook body 11b.

Figure 9:
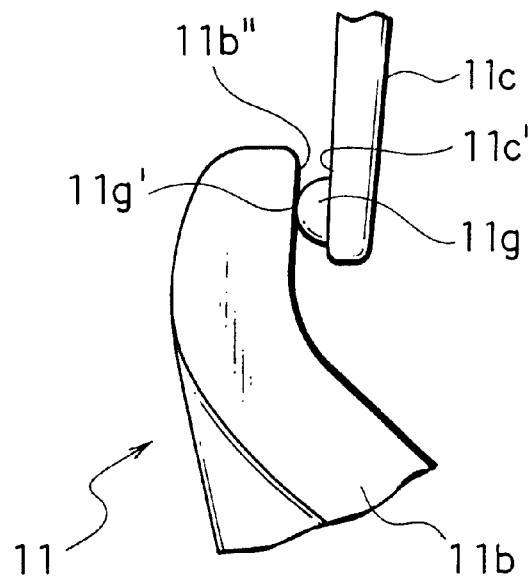
FIG. 9 is an enlarged front view of the front end engaging portion of the swivel snap hook according to a fifth embodiment of the present invention.

FIG. 9 shows a fifth embodiment of the present invention. Although according to the above described embodiments, the protrusion 11f is provided on the front-end inside engaging face 11b" of the hook body 11b, according to this fifth embodiment, a protrusion 11g is provided on a front-end outside engaging face 11c' of the stopper piece 11c. The configurations of the protrusion 11g and a minute portion 11g' at its vertex may be the same as those of the protrusion 11f and the minute portion 11f' of the second embodiment. Further, the operation and effect of this embodiment are the same as the first and the second embodiments.

Figure 10:
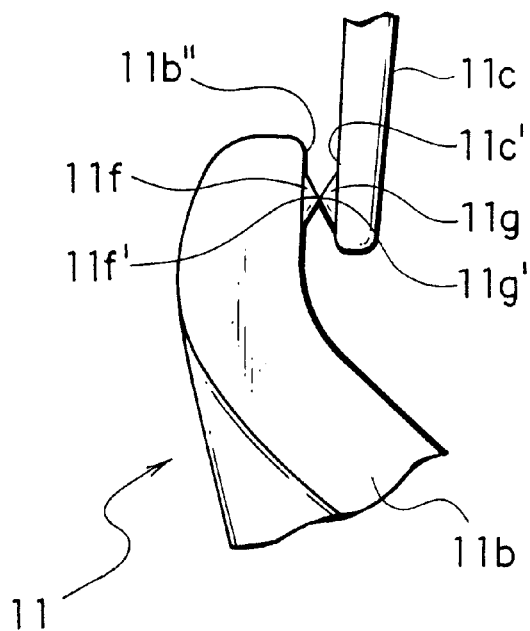
FIG. 10 is an enlarged front view of the front-end engaging portion of the swivel snap hook according to a sixth embodiment of the present invention.

FIG. 10 shows a sixth embodiment of the present invention. According to the above described embodiments, either the protrusion 11f or 11g is provided on the front-end inside engaging face 11b" of the hook body 11b or the front-end outside engaging face 11c' of the stopper piece 11c. According to this sixth embodiment, on the other hand, both the protrusions 11f and 11g are provided on both the front-end inside engaging face 11b" of the hook body 11b and the front-end outside engaging face 11c' of the stopper piece 11c. The configurations of these protrusions 11f and 11g may be the same as that of the protrusion 11f described above. The operation and effect thereof are substantially the same as the embodiments described already above.

As evident from the above description, the swivel snap hook of the present invention may be modified in various ways and therefore, the present invention should not be restricted to the above described embodiments.

What is claimed is:

1. A swivel snap hook of synthetic resin including:

a hook body having a hook extended from a base portion of the hook body; and a stopper piece having a front-end outside engaging face to be engaged with a front-end inside engaging face of a curved portion of the hook body, the front-end outside engaging face being extended up to the front-end inside engaging face, said stopper piece being elastically deformable with respect to a base end thereof as a fulcrum, wherein a protrusion is disposed in a gap between at least the front-end inside engaging face of the curved portion and the front-end outside engaging face, which is a flat face, of the stopper piece, said protrusion having a minute protruding height and a cross section decreasing gradually from its proximal end, which is molded integrally with the front-end inside engaging face of the curved portion, toward its tip, and said tip of the protrusion is molded integrally with the front-end outside engaging face of the stopper piece.

2. A swivel snap hook of synthetic resin including:

a hook body having a hook extended from a base portion of the hook body; and a stopper piece having a front-end outside engaging face to be engaged with a front-end inside engaging face of a curved portion of the hook body, the front-end outside engaging face being extended up to the front-end inside engaging face, said stopper piece being elastically deformable with respect to a base end thereof as a fulcrum, wherein a protrusion is disposed in a gap between at least the front-end outside engaging face of the stopper piece and the front-end inside engaging face, which is a flat face, of the curved portion, said protrusion having a minute protruding height and a cross section decreasing gradually from its proximal end, which is molded integrally with the front-end outside engaging face of the stopper piece, toward its tip, and said tip of the protrusion is molded integrally with the front-end inside engaging face of the curved portion.

3. A swivel snap hook of synthetic resin according to claim 1 or 2, further including a rib-like protrusion provided below the front-end inside engaging face of the curved portion, the rib-like protrusion having an inside end face on an extension of a front-end inside face of the stopper piece.

4. A swivel snap hook of synthetic resin according to claim 3, wherein a height of the rib-like protrusion is slightly shorter than a gap between the stopper piece and the bottom face of the hook body.

5. A swivel snap hook of synthetic resin according to claim 3, wherein the rib-like protrusion is connected to the protrusion having a minute protruding height and protruded from the inside engaging face of the curved portion.

* * * * *